US007526976B2

(12) United States Patent
Cheng

(10) Patent No.: US 7,526,976 B2
(45) Date of Patent: May 5, 2009

(54) CONTROL DEVICE FOR PERIODICAL DRIVING SYSTEM

(75) Inventor: Tai Jung Cheng, Wurih Township (TW)

(73) Assignee: Sun Ho-Wei, Taichung Hsien (TW)

( * ) Notice: Subject to any disclaimer, the term of this patent is extended or adjusted under 35 U.S.C. 154(b) by 450 days.

(21) Appl. No.: 11/520,720

(22) Filed: Sep. 14, 2006

(65) Prior Publication Data

US 2008/0066985 A1    Mar. 20, 2008

(51) Int. Cl.
*F16H 1/06* (2006.01)
*F16H 27/00* (2006.01)
*F16H 29/00* (2006.01)

(52) U.S. Cl. .......................................... 74/415; 74/112

(58) Field of Classification Search ................... 74/111, 74/112, 122, 415
See application file for complete search history.

(56) References Cited

U.S. PATENT DOCUMENTS 2,004,325 A * 6/1935 Ibanez .......................... 74/415
2,307,886 A * 1/1943 Hansson ...................... 335/118
2,784,613 A * 3/1957 Smalchuck ................... 74/415
2,920,501 A * 1/1960 Couch .......................... 74/522
6,902,507 B2 * 6/2005 Ballard ........................ 475/168

* cited by examiner

*Primary Examiner*—Thomas R Hannon
*Assistant Examiner*—Justin Krause
(74) *Attorney, Agent, or Firm*—Bacon & Thomas, PLLC

(57) ABSTRACT

A periodical driving system includes a circular wheel having a plurality of radial recesses defined in an outer periphery of the wheel and each recess is defined by two inner sides and each inner side includes an inward curved section so as to form a convergent opening in the outer periphery of the wheel. A driving disk has two driving pins extending therefrom and each driving pin has a cylindrical base portion extending from the disk and a protrusion extends axially from a distal end of each base portion. The driving pins enter into the recesses via the openings so as to push the inner sides of each recess. The two protrusions are in contact with the two curved sections of the two recesses when the wheel is in stationary status.

10 Claims, 9 Drawing Sheets

CONTROL DEVICE FOR PERIODICAL DRIVING SYSTEM

FIELD OF THE INVENTION

The present invention relates to a control device for a periodical driving system which includes a wheel with driving slots and the control device includes two driving members alternatively engaged with the driving slots.

BACKGROUND OF THE INVENTION

A conventional periodical driving system 10 is shown in FIG. 1 and generally includes a wheel 11 which includes a plurality of radial driving slots 111 and recesses 112 defined alternatively along a periphery of the wheel 11, and a driving disk 12 includes a curved member 121 and a pin 122. When the wheel 11 is a stationary status, the curved member 121 is engaged with one of the recesses 112 and the pin 122 is located in an opening one of the driving slots 111. However, when the pin 122 enters into the driving slot 111, only half of the curved member 121 is engaged with the recess 112. In other words, there is a part of the recess 112 is not engaged with the curved member 121. The wheel 11 is easily rotated due to gravity or foreign impact because the driving disk 12 does not effectively hold the wheel 11 at the stationary status. Once the wheel 11 is unintentionally rotated, the related parts connected with the wheel 11 move and may cause severe impact between parts or even injury to the users. Besides, the single pin 122 can only be engaged with the driving slot 111 once per revolution of the wheel 11, and this consumes too much time. As shown in FIG. 2, another conventional periodical driving system 20 includes a wheel 21 with a plurality of radial driving slots 211 and the driving disk 22 has two pins 221 which are alternatively engaged with the driving slots 211. Therefore, the wheel 21 can be held every half revolution. Nevertheless, in order to allow the pins 221 to enter into the driving slots 211 easily, each driving slot 211 has a divergent and curved opening 212 which is adverse for the pins 221 to hold the wheel 21 at its stationary status. The pins 221 may slip off from the openings 212 due to gravity of the wheel 21 or foreign impact to the wheel 21.

The present invention intends to provide a control device for periodical driving system and the control device includes two driving protrusions which can be effectively stayed in the recesses of the wheel of the system to hold the wheel at its stationary status.

SUMMARY OF THE INVENTION

The present invention relates to a periodical driving system that comprises a circular wheel having a top surface portion and a plurality of high portions extend from the top surface portion at an equal angular interval. The high portions are located at a distance from an outer periphery of the wheel and a low portion is defined between each high portion and the outer periphery of the wheel. An open space is defined between the low portion and an end of the high portion. A plurality of recesses is defined between the high portions and opens to the outer periphery of the wheel. Each recess is defined by two inner sides and each inner side includes an inward curved section so as to form a convergent opening in the outer periphery of the wheel.

A driving disk has a disk body which has a disk surface located corresponding to the top surface portion of the wheel. Two driving pins extend from the disk surface and each driving pin has a cylindrical base portion extending from the disk surface and a protrusion extends axially from a distal end of each base portion. A height between the distal end of the base portion and a distal end of the protrusion is higher than a height from the inner bottom of the recess to the low portion so that the driving pins can freely moved over the spaces and the enter into the recesses via the openings, and to push the inner sides of each recess. The two protrusions are in contact with the two curved sections of the two recesses when the wheel is in stationary status.

The primary object of the present invention is to provide a control device for a periodical driving system and the control device provides two contact points with the wheel when the wheel is in its stationary status so that the stationary status of the wheel is well obtained.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
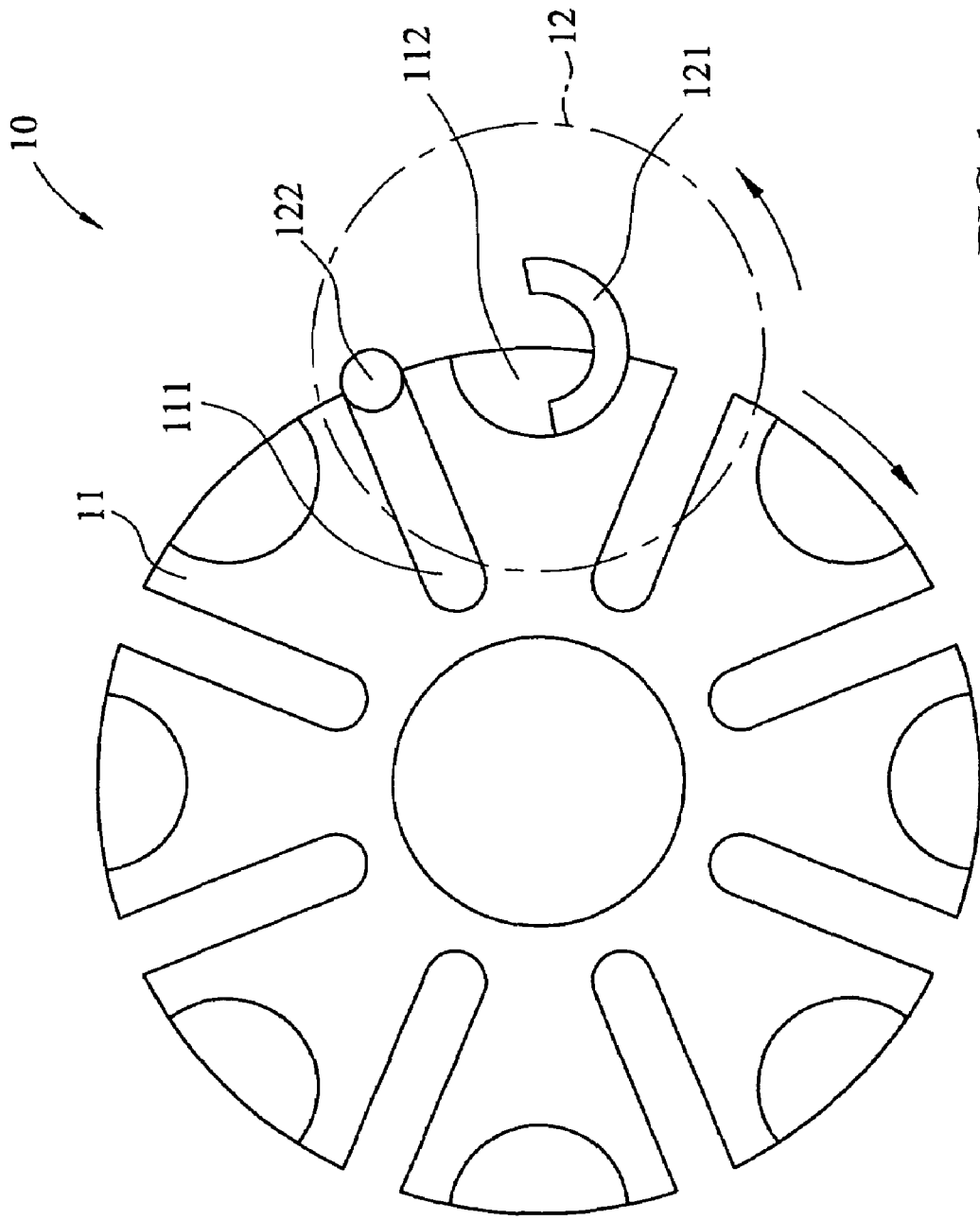
FIG. 1 shows a first conventional periodical driving system.
Figure 2:
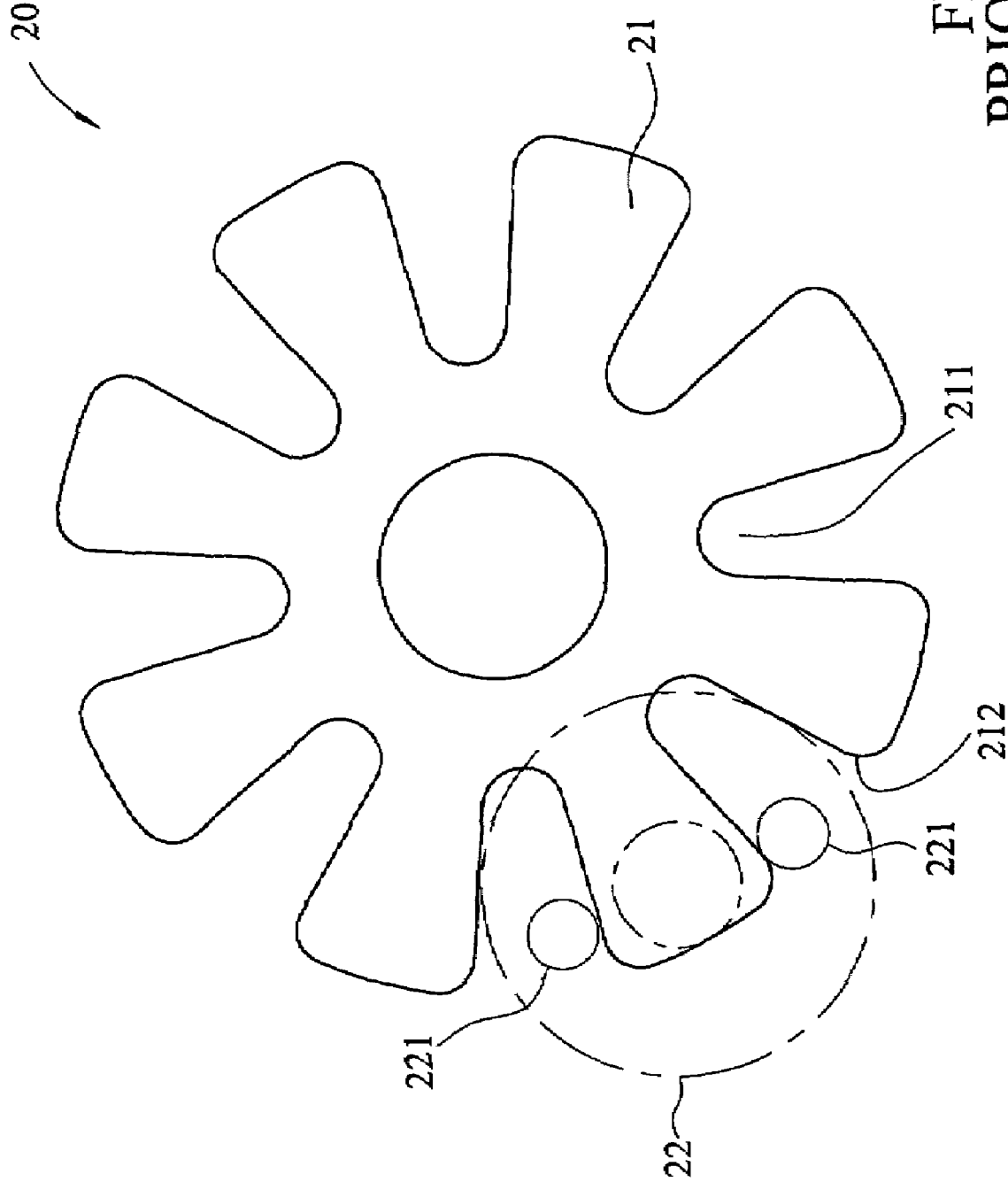
FIG. 2 shows a second conventional periodical driving system.
Figure 3:
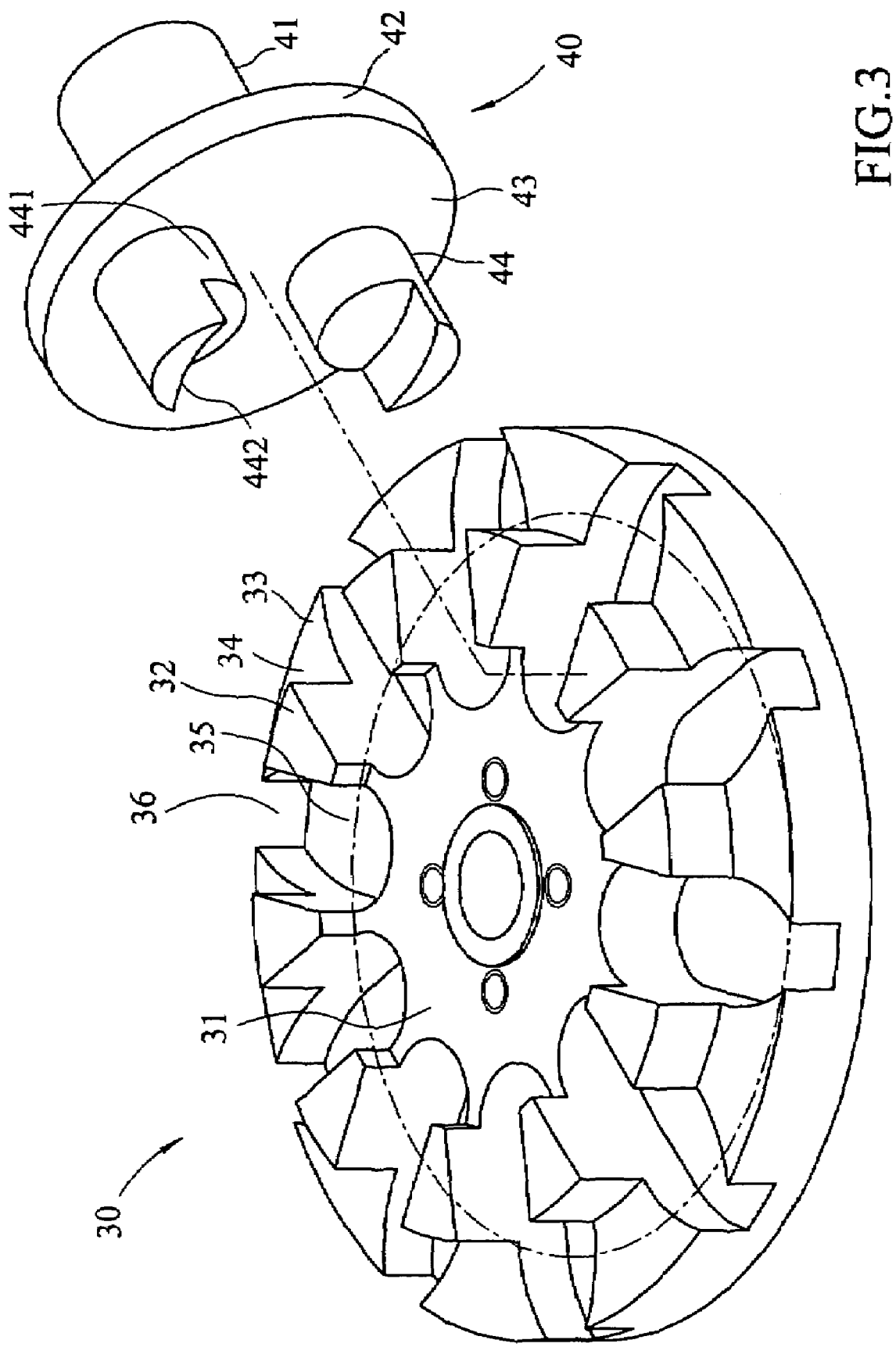
FIG. 3 is an exploded view to show the periodical driving system of the present invention.
Figure 4:
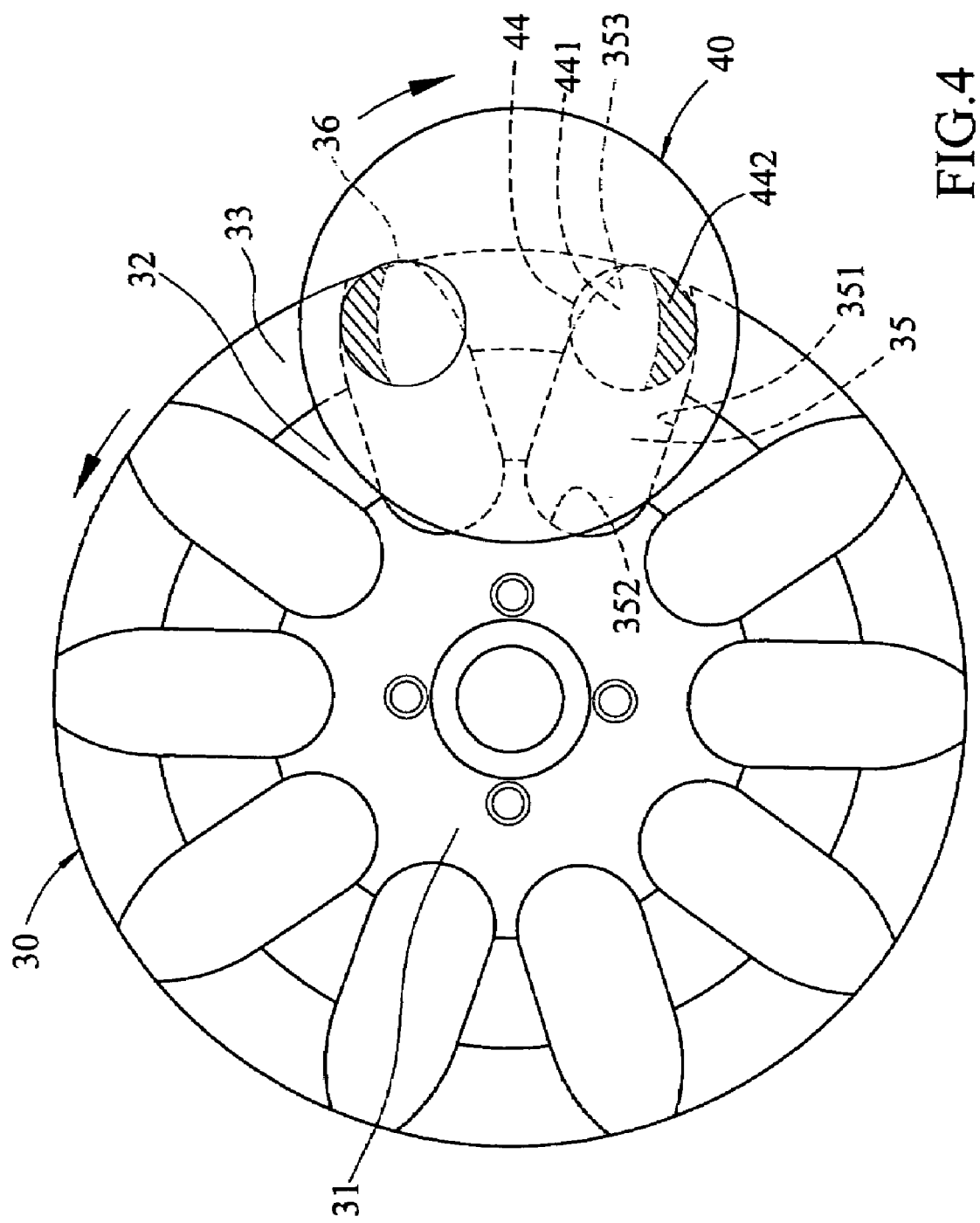
FIG. 4 shows that the two protrusions are engaged with the slots of the wheel of the present invention.

Referring to FIGS. 3 and 4, the periodical driving system of the present invention comprises a circular wheel 30 having a top surface portion 31 and a plurality of high portions 32 extend from the top surface portion at an equal angular interval. The high portions 32 located at a distance from an outer periphery of the wheel 30 and a low portion 33 is defined between each high portion 32 and the outer periphery of the wheel 30. A vertical surface is connected between the high portion 32 and the low portion 33 which is a fan-shaped low portion and includes a horizontal surface. An open space 34 is defined between the low portion 33 and an end of the high portion 32. A plurality of recesses 35 are defined between the high portions 32 and open to the outer periphery of the wheel 30. An inner bottom of each recess 35 is lower than the low portions 33. Each recess 35 is defined by two inner sides and a curved end 353 which is located close to a center of the wheel 30. The two inner sides of each recess 35 each include a straight inner side 351 located corresponding to the high portion 32 corresponding thereto, and an inward curved sec tion 353 so as to form a convergent opening 36 in the outer periphery of the wheel 30. The straight inner sides 351 of each recess 35 are parallel to each other.

A driving disk 40 having a disk body 42 which has a disk surface 43 located corresponding to the top surface portion 31 of the wheel 30 and a shaft 41 extends from a center of the disk 40. The shaft 41 extends from a side opposite to the disk surface 43 and can be driven by a motor (not shown). Two driving pins 44 extend from the disk surface 43 and each driving pin 44 has a circular cylindrical base portion 441 extending from the disk surface 43 and a protrusion 442 extends axially from a distal end of each base portion 441. Each of the protrusions 442 is a crescent-shaped protrusion and has an outer periphery to contact the straight inner sides 351 to drive the circular wheel 30. The outer periphery of each protrusion 442 is in flush with the outer periphery of the driving pin 44. A height between the distal end of the base portion 441 and a distal end of the protrusion 442 is higher than a height from the inner bottom of the recess 35 to the low portion 33, so that the protrusions 442 of the driving pins 44 can be freely through over the spaces 34 and over the low portions 33 and then the enter into the recesses 35 via the openings 36 so as to push the inner sides 351 of each recess 35.

It is noted that, when the wheel 30 is in stationary status, the two protrusions 442 are in contact with the two curved sections 353 of the two recesses 35. In other words, because the respective curvatures of the curved sections 353 and the protrusions 442 are the same so that the protrusions 442 do not apply a force to rotate the wheel 30 so that the wheel 30 does not rotate by a sudden impact or even the gravity.

Figure 5:
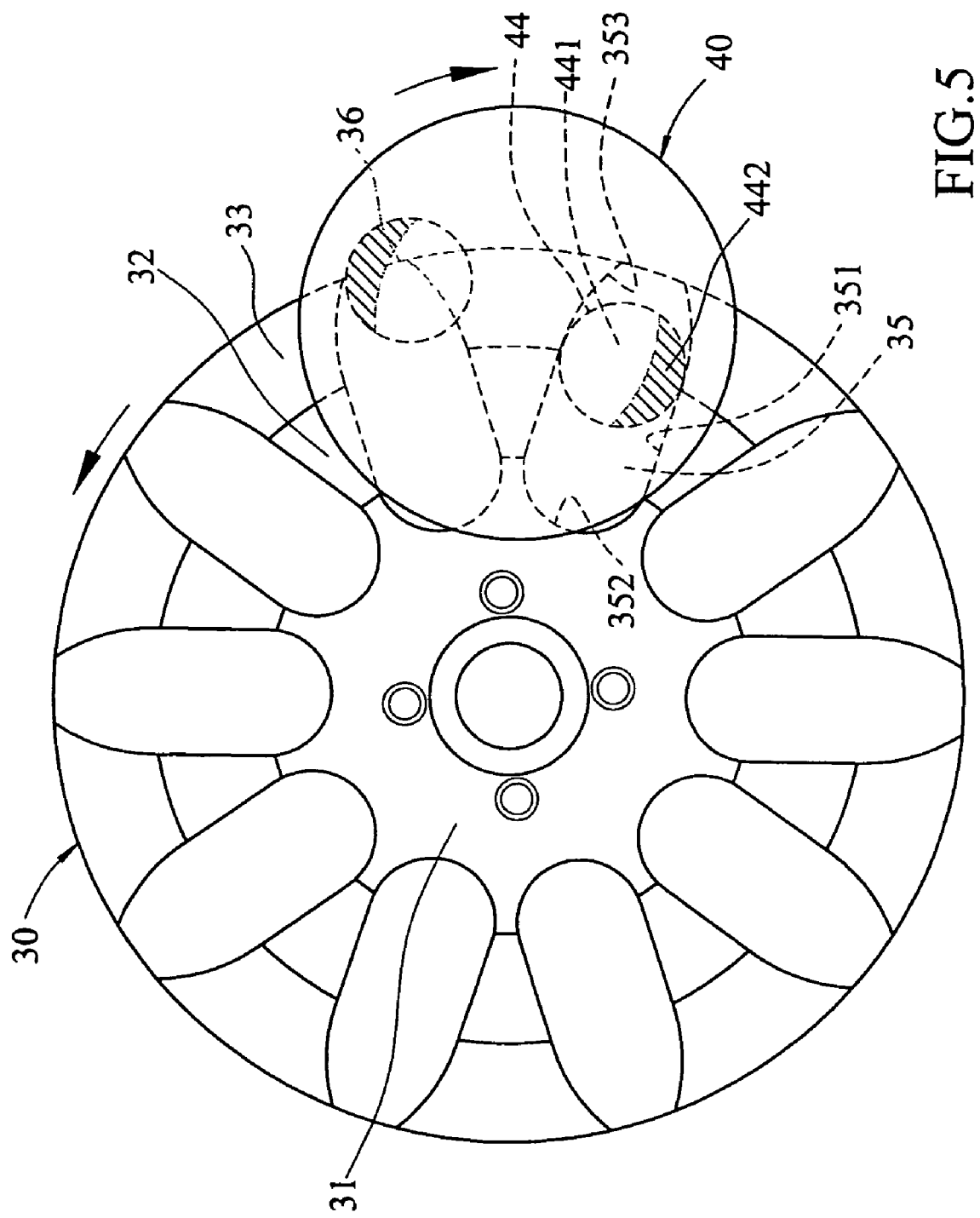
FIG. 5 shows that one of the two protrusions is to move out from the slot of the wheel and the other protrusion is to be moved into the inner end of the slot.
Figure 6:
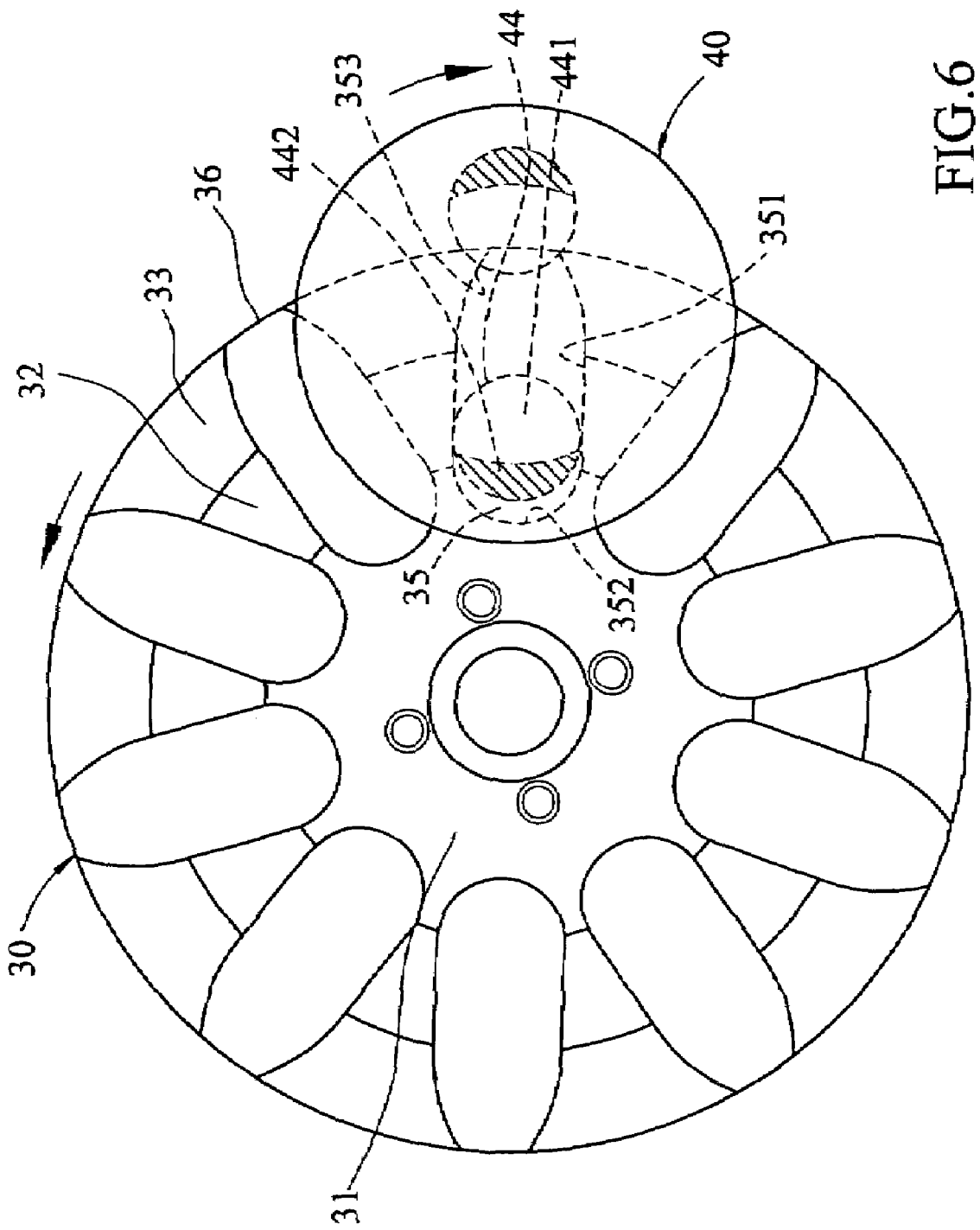
FIG. 6 shows that when one of the two protrusions is to be reached the inner end of the slot, the other protrusion moves toward the adjacent slot.

As shown in FIGS. 5 and 6, when the wheel 30 is rotated, one of the two protrusions 442 removes out from the recess 35 via the opening 36 and the other protrusion 442 moves along the straight inner side 351 and toward the curved inner end 352 of the recess 35 corresponding thereto. By this way, the protrusions 442 alternatively move into the recesses 35 to rotate the wheel 30 at a pre-set time interval.

Figure 7:
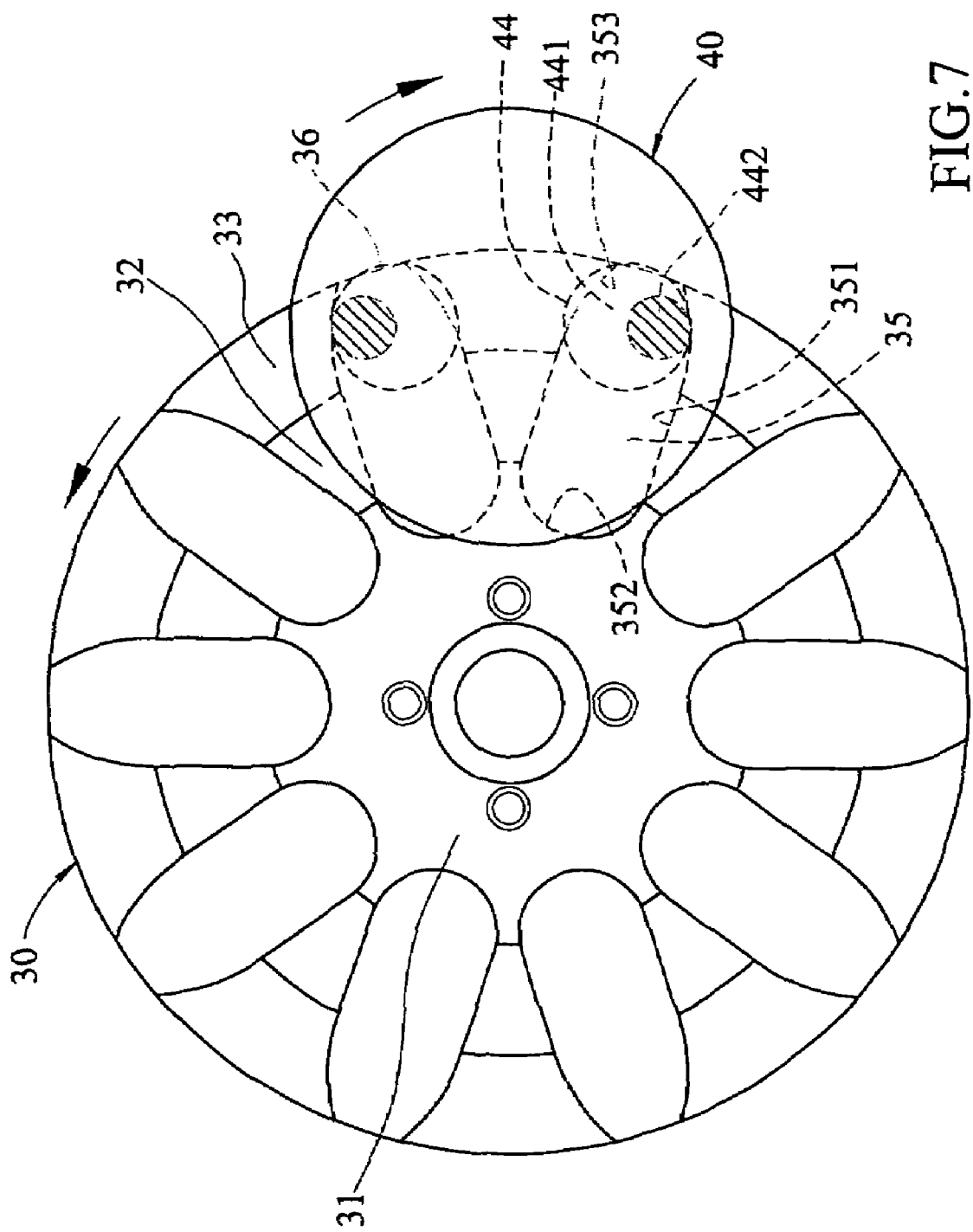
FIG. 7 shows another embodiment of the protrusions.

Of course, the protrusions 442 can be a cylindrical protrusion as shown in FIG. 7 or any other shape.

Figure 8:
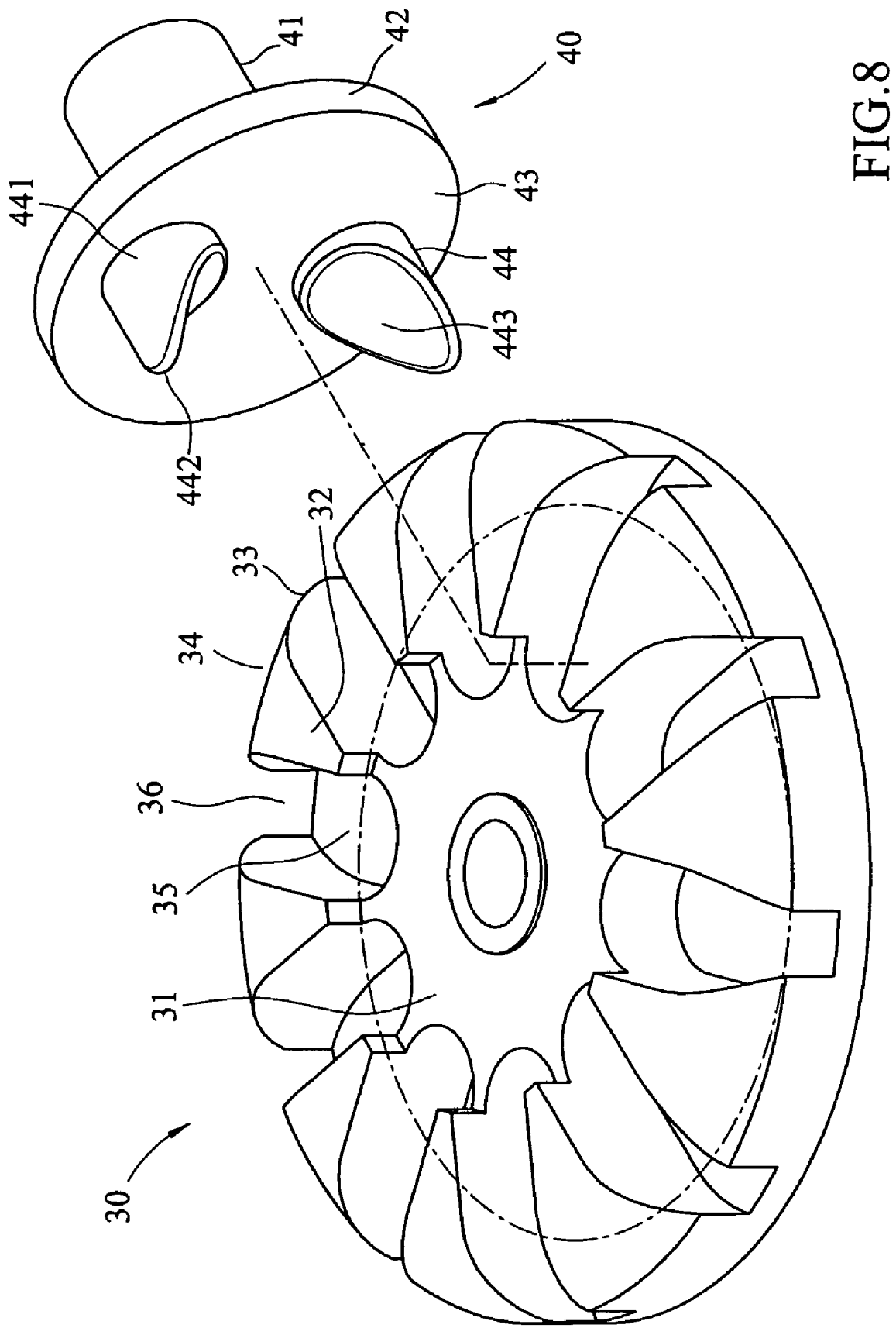
FIG. 8 shows another embodiment of the wheel and the driving disk of the present invention.
Figure 9:
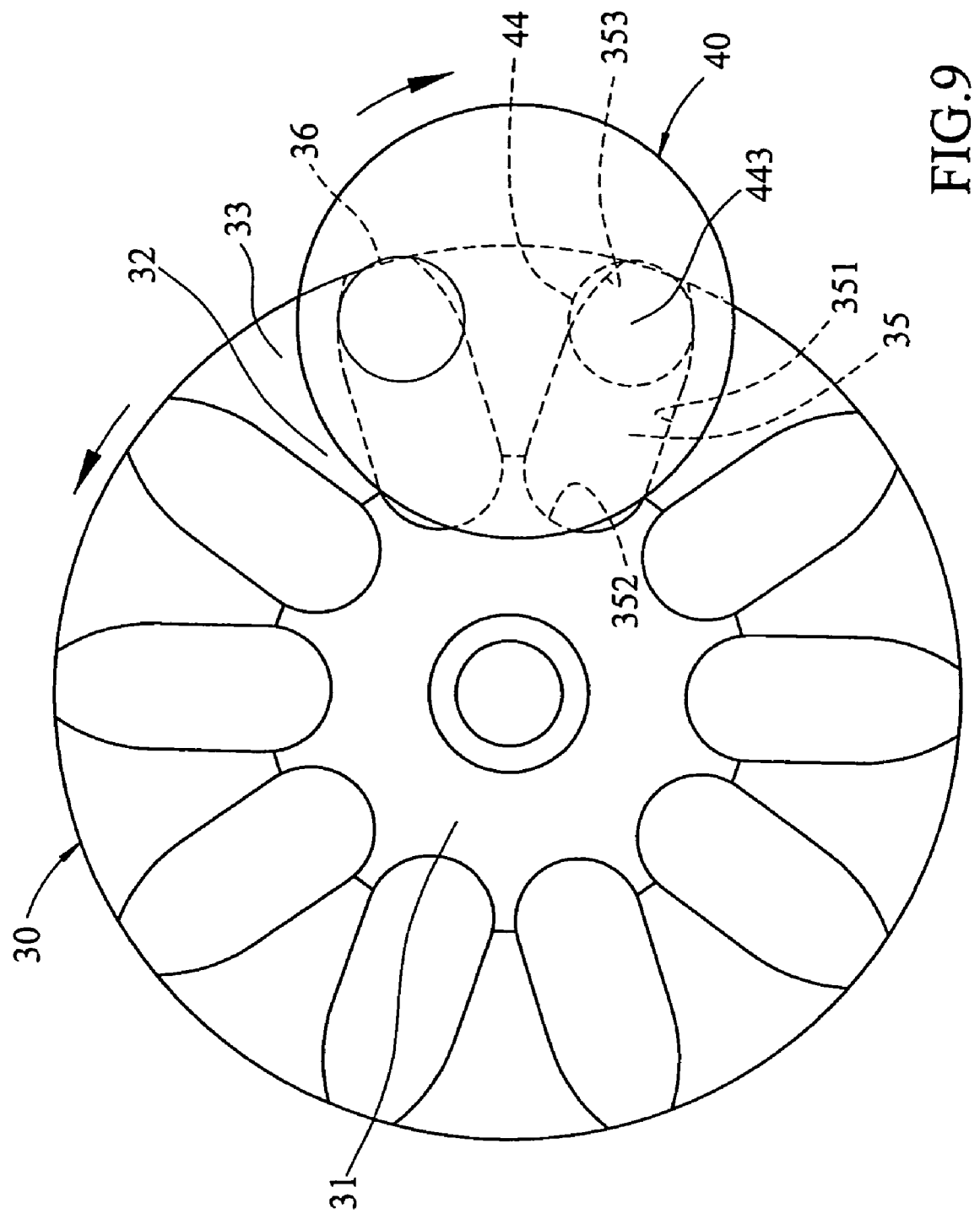
FIG. 9 shows that the protrusions disclosed in FIG. 8 are engaged with the recesses of the wheel.

FIGS. 8 and 9 show another embodiment of the wheel 30 and the driving disk 40 wherein the driving pins 44 on the driving disk 40 are two circular and cylindrical pins and each driving pin 44 has a concave and inclined recess 443 defined in a distal end thereof so as to form the protrusion 442 as a rounded tip protrusion 442 at the distal end of each driving pin 44. The outer periphery of each protrusion 442 is in flush with the outer periphery of the driving pin 44. Each high portion 32 and the low portion 33 corresponding to the high portion 32 on the wheel 30 in this embodiment are smoothly connected with each other. In other words, the high portion 32 is located higher than the low portion 33 so as to from a curved surface with a gradually downward slope connected between the high portion 32 and the low portion 33. The downward slope forms a downward open space 34 so that the protrusions 442 of each of the driving pins 44 can move through the downward space 34 and over the low portion 33 to allow the protrusions 442 to move from one recess to another.

While we have shown and described the embodiment in accordance with the present invention, it should be clear to those skilled in the art that further embodiments may be made without departing from the scope of the present invention.

What is claimed is:

1. A periodical driving system comprising:
a circular wheel having a top surface portion and a plurality of high portions extending from the top surface portion at an equal angular interval, the high portions located at a distance from an outer periphery of the wheel and a low portion defined between each high portion and the outer periphery of the wheel, an open space defined between the low portion and an end of the high portion, a plurality of recesses defined between the high portions and opening to the outer periphery of the wheel, an inner bottom of each recess being lower than the low portions, each recess defined by two inner sides and each inner side including an inward curved section so as to form a convergent opening in the outer periphery of the wheel, and
a driving disk having a disk body which has a disk surface located corresponding to the top surface portion of the wheel, two driving pins extending from the disk surface and each driving pin having a cylindrical base portion extending from the disk surface and a protrusion extending axially from a distal end of each base portion, a height between the distal end of the base portion and a distal end of the protrusion being higher than a height from the inner bottom of the recess to the low portion, the driving pins being freely moved through the spaces and the entering into the recesses via the openings so as to push the inner sides of each recess, the two protrusions being in contact with the two curved sections of the two recesses when the wheel is in stationary status, one of the two protrusions moving out from the recess via the opening and the other protrusion moving toward a curved inner end of the recess corresponding thereto when the wheel is rotated.

2. The system as claimed in claim 1, wherein an outer periphery of each protrusion is in flush with an outer periphery of the driving pin.

3. The system as claimed in claim 1, wherein each low portion is a fan-shaped low portion and includes a horizontal surface.

4. The system as claimed in claim 1, wherein a vertical surface is connected between the high portion and the low portion.

5. The system as claimed in claim 1, wherein a curved surface with a gradually downward slope is connected between the high portion and the low portion.

6. The system as claimed in claim 5, wherein each of the driving pins is a circular and cylindrical pin and a concave and inclined recess is defined in a distal end of each driving pin so as to form a rounded tip protrusion at the distal end of each driving pin.

7. The system as claimed in claim 1, wherein each recess includes two straight and parallel inner sides which are located corresponding to the high portions.

8. The system as claimed in claim 1, wherein the disk body has a shaft extends from a center thereof and the shaft extends from a side opposite to the disk surface.

9. The system as claimed in claim 1, wherein each of the protrusions is a crescent-shaped protrusion.

10. The system as claimed in claim 1, wherein each of the protrusions is a cylindrical protrusion.

* * * * *